(12) United States Patent
Hughlett

(10) Patent No.: US 8,977,515 B2
(45) Date of Patent: Mar. 10, 2015

(54) ALTERNATIVE BALANCED DRUMSTICK SYSTEM

(76) Inventor: David James Hughlett, Oconomowoc, WI (US)

(*) Notice: Subject to any disclaimer, the term of this patent is extended or adjusted under 35 U.S.C. 154(b) by 349 days.

(21) Appl. No.: 12/807,367

(22) Filed: Sep. 3, 2010

(65) Prior Publication Data

US 2011/0166820 A1   Jul. 7, 2011

Related U.S. Application Data

(60) Provisional application No. 61/335,402, filed on Jan. 7, 2010.

(51) Int. Cl.
*G01N 9/36* (2006.01)
*G01B 5/02* (2006.01)
*G01M 1/12* (2006.01)
*G10D 13/00* (2006.01)

(52) U.S. Cl.
CPC . *G01B 5/02* (2013.01); *G01M 1/12* (2013.01); *G10D 13/003* (2013.01)
USPC ......................................... 702/137; 84/422.4

(58) Field of Classification Search
CPC .......... G01B 5/02; G10D 13/003; G01M 1/12
USPC .......................................... 84/422.4; 702/137
See application file for complete search history.

(56) References Cited

U.S. PATENT DOCUMENTS

| 2,735,291 | A | * | 2/1956 | Quinn | 73/65.09 |
| 3,958,485 | A | | 5/1976 | Peters | |
| 4,905,566 | A | * | 3/1990 | Hughlett et al. | 84/422.4 |
| 5,218,152 | A | * | 6/1993 | Campbell et al. | 84/422.4 |
| D362,864 | S | | 10/1995 | Berardi | |
| 6,028,260 | A | * | 2/2000 | LaLonde | 84/422.4 |
| 6,028,261 | A | | 2/2000 | Johnson | |
| 6,271,451 | B1 | | 8/2001 | Gress | |
| 6,307,138 | B1 | | 10/2001 | Simpson | |
| 6,310,278 | B1 | | 10/2001 | Butler | |
| 6,326,535 | B1 | | 12/2001 | Pokallus | |
| 6,365,813 | B1 | | 4/2002 | Gress | |
| 6,759,583 | B2 | | 7/2004 | Mizuno et al. | |
| 6,924,423 | B2 | | 8/2005 | O'Donnell | |
| 7,173,176 | B2 | | 2/2007 | Nybye | |
| 7,439,435 | B1 | | 10/2008 | Jendrisak | |
| 7,538,264 | B1 | | 5/2009 | Turos | |
| 7,557,286 | B2 | | 7/2009 | Capotosto | |
| 2003/0040376 | A1 | * | 2/2003 | Cackett et al. | 473/345 |
| 2004/0231493 | A1 | * | 11/2004 | Milne et al. | 84/422.4 |

(Continued)

OTHER PUBLICATIONS

Heath, T. L., ScD. Cambridge University, "The Works of Archimedes, edited in a modern notation by T.L. Heath", University Press, 1897, pp. 190-220.*

Vic Firth advertisment, UpBeat Daily, Offical Natioal Association of Musical Merchants Show Publication, Anaheim, CA, Jan. 16, 2010, p. 37.

(Continued)

*Primary Examiner* — John Breene
*Assistant Examiner* — Stephanie Bloss
(74) *Attorney, Agent, or Firm* — Young Basile Hanlon & MacFarlane P.C.

(57) ABSTRACT

A balanced drumstick system and method permanently reposition the longitudinal center of gravity of a plurality of wood drumsticks to common new specified location to create custom sets of balanced wood drumsticks. The system and method automate the repositioning of the longitudinal center of gravity of wood drumsticks to increase accuracy and to decrease time to create sets of custom wood drumsticks.

19 Claims, 4 Drawing Sheets

(56) References Cited

U.S. PATENT DOCUMENTS

2006/0090629 A1* 5/2006 Nybye ............................ 84/422.4
2009/0111596 A1* 4/2009 Owen et al. ..................... 473/47
2011/0162511 A1* 7/2011 Richard ......................... 84/422.4

OTHER PUBLICATIONS

3 Drumsticks, http://www.3drumsticks.com/technology.asp.
Understanding Drum Technique by Dave Hughlett book, Musicians and Injuries, The International Foundation for Performing Arts Medicine, http://rsi.unl.edu/music.html.

* cited by examiner

ALTERNATIVE BALANCED DRUMSTICK SYSTEM

CROSS-REFERENCE TO RELATED PATENT APPLICATIONS

The present application claims priority under 35 U.S.C. 120 from U.S. Provisional Patent Application Ser. No. 61/335,402 filed on Jan. 7, 2010 by David J. Hughlett and entitled ALTERNATIVE BALANCED DRUMSTICK SYSTEM, the full disclosure of which is hereby incorporated by reference.

BACKGROUND

There have been many efforts toward making a drumstick of better tonal quality, better "feel" for the user, more durability, more uniform properties, and reduced cost. Existing stick sets may not be properly balanced, customized for a specific user or performance result and may not be affordable for the average user.

DETAILED DESCRIPTION OF THE INVENTION

Figure 1:
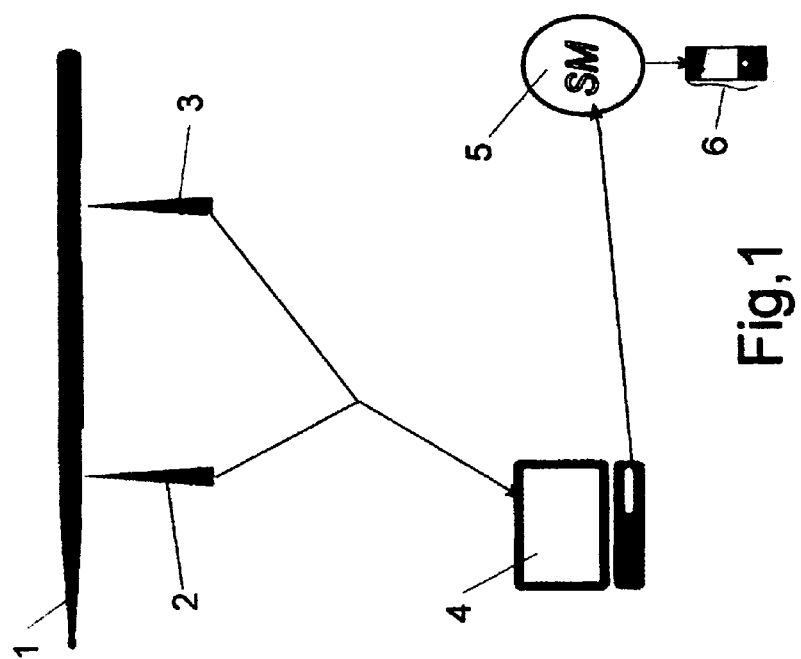
FIG. 1 depicts a schematic view of a system embodying the principles of the present invention.

The traditional wood drumstick has a center of gravity located in the range of 42% to 57.3% of its total length, measured from the handle end, also referred to as the butt end, of the drumstick. The location of the center of gravity is a function of the physical characteristics of the particular drumstick. Variations in length, shape and material density contribute to the variation in the center of gravity location. Wood drumsticks of equal length and shape have varying centers of gravity due to the nonuniform density of wood. Ideally, the two drumsticks typically used for playing a percussion instrument have identical physical characteristics, including center of gravity location.

For the purposes of invention description contained herein, an unbalanced drumstick is defined as a drumstick that has not been modified to achieve a repositioned center of gravity. Similarly, a balanced drumstick is defined as a drumstick that has been modified to achieve a repositioned center of gravity. A custom drumstick is defined as a balanced drumstick for a specific user or performance result.

The criteria for a custom drumstick with a specific center of gravity location can be based on a particular percussionist's preference or a desired performance result. Such preference or result might require a center of gravity behind the rotation point, or toward the handle end, also commonly referred to as the butt end, for more speed and less power or it might require a center of gravity forward of the rotation point, or toward the striking end, to accommodate a drumming technique commonly referred to as "back sticking". A balanced drumstick is more ergonomic, providing for ease of rotation and fewer user injuries from repetitive motion. Custom drumstick sets may comprise more than two custom drumsticks such that a replacement drumstick is immediately available to a user in the event of a loss or breakage of one of the drumsticks.

FIGS. 1-4 illustrate balanced drumstick system 100, also called drumstick balancing system 100, comprising a first scale 2, a second scale 3, a computer system 4, an actuator 5, a cutting device 6, a distance locator 9, and a weight element 10 configured to balance a wood drumstick 1, the drumstick 1 including a handle end 7 and a striking end 8.

First scale 2 and second scale 3 measure weight of drumstick 1. First scale 2 comprises a weight-measurement scale configured to measure a portion of the weight of drumstick 1 at a first location along the length of drumstick 1 and generate a signal 23 representing the weight measurement. Second scale 3 comprises a weight-measurement scale configured to measure a portion of the weight of drumstick 1 at a second location along the length of drumstick 1 and generate a signal 24 representing the weight measurement. The signals 23 and 24 from first scale 2 and second scale 3 are inputted to computer system 4.

Figure 2:
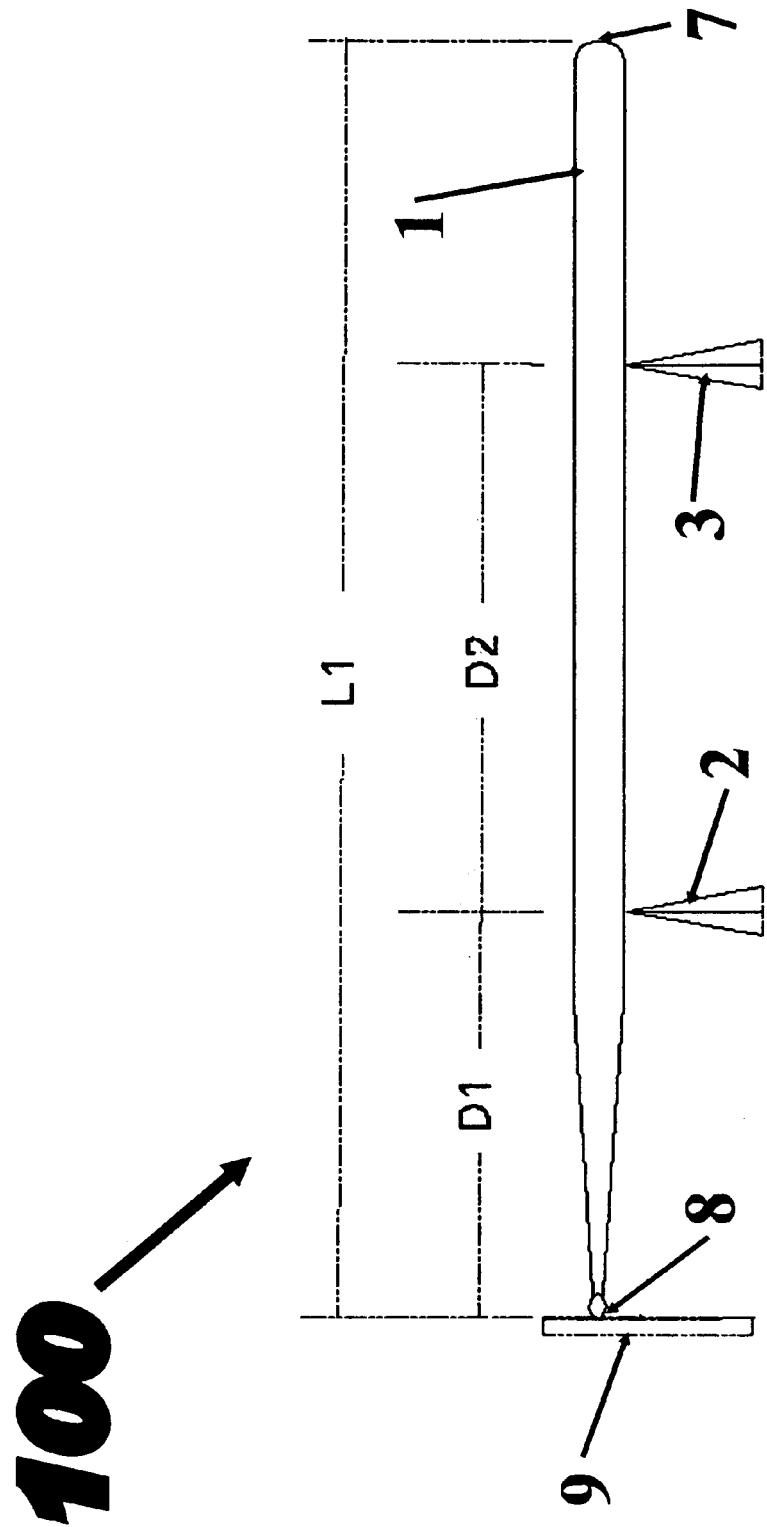
FIG. 2 depicts a schematic view of a portion of a system embodying the principles of the present invention.

As shown in FIGS. 1 and 2, drumstick 1 is placed to rest on defined points of first scale 2 and second scale 3 such that striking end 8 of drumstick 1 is located nearest to first scale 2. The length of drumstick 1 from handle end 7 to striking end 8, defined as L1, is measured. The distance from striking end 8 to the location on drumstick 1 that bears weight on scale 2, defined as D1, is measured. The distance from the location on drumstick 1 that bears weight on first scale 2 to the location on drumstick 1 that bears weight on second scale 3, defined as D2, is measured. Length L1 and distances D1 and D2 are inputted to computer system 4.

FIG. 2 illustrates an example embodiment of balanced drumstick system 100 wherein striking end 8 of drumstick 1 is placed against a distance locator 9 and the locations of first scale 2 and second scale 3 are in a fixed geometric arrangement relative to each other and also relative to distance locator 9. Distance locator 9 comprises a vertical surface against which striking end 8 of drumstick 1 is placed. The fixed geometric arrangement of first scale 2, second scale 3 and distance locator 9 relative to each other results in distances D1 and D2 that are constant for any length L1 of drumstick 1. The preferred embodiment shown in FIG. 2, when applied to a plurality of drumsticks comprising two or more drumsticks 1, allows distances D1 and D2 to be inputted to computer system 4 once. In other embodiments, distance locator 9 may be omitted.

Figure 3:
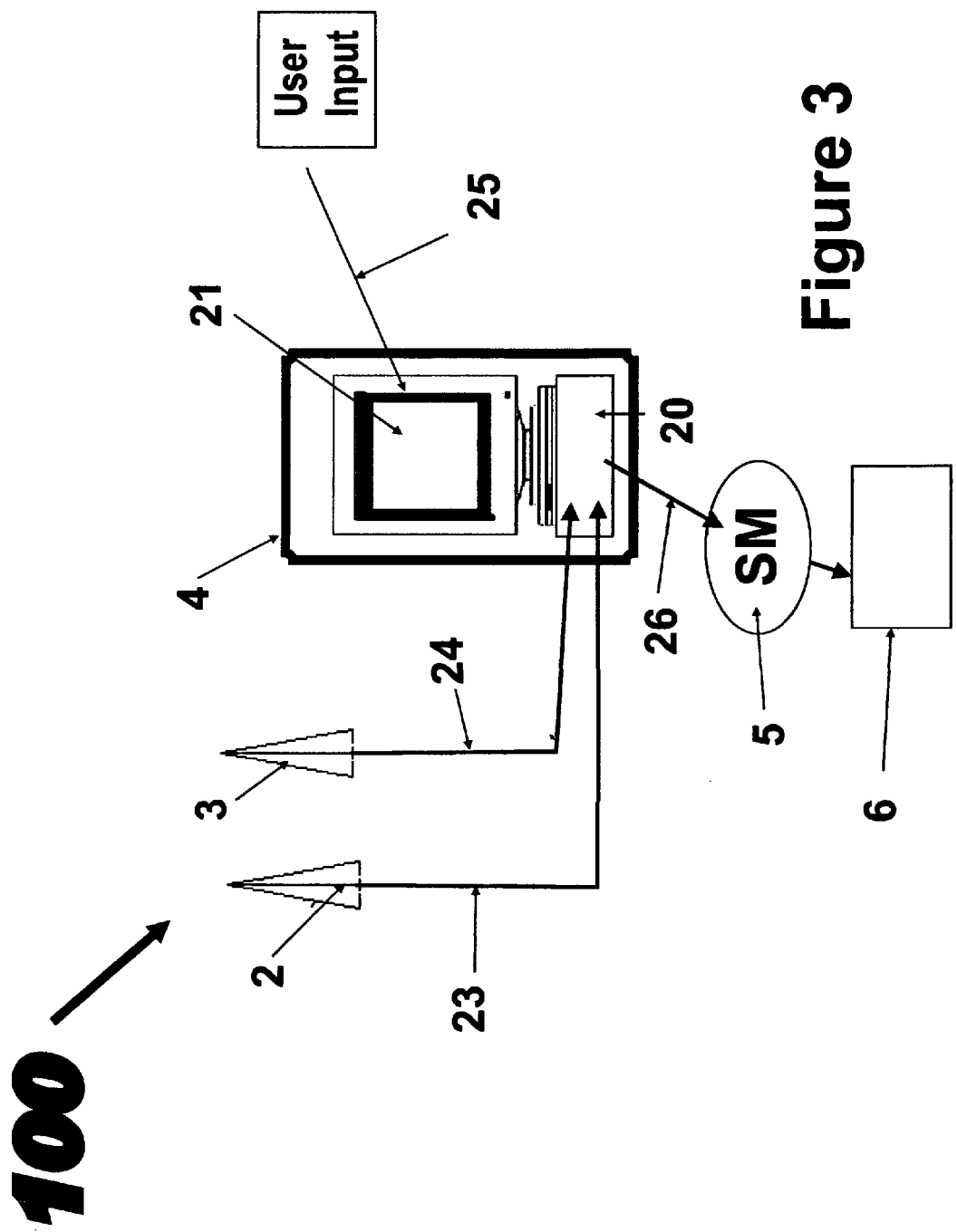
FIG. 3 depicts a schematic view of a portion of a system embodying the principles of the present invention.

As shown in FIGS. 1 and 3, computer system 4 includes a microprocessor 20 and a user interface 21. Microprocessor 20 is configured to generate control signals 26 based upon user input 25 through the user interface 21 and weight signals 23 and 24 from first scale 2 and second scale 3. User input through user interface 21 includes measured distances D1 and D2 and length measurement L1. Microprocessor 20 calculates the weight of drumstick 1 by summing weight inputs 23 and 24 from first scale 2 and second scale 3. Microprocessor 20 locates, by calculation, an original longitudinal center of gravity of drumstick 1 using distances D1 and D2, length L1, weight inputs 23 and 24 from first scale 2 and second scale 3 and the calculated weight of drumstick 1. A desired new longitudinal center of gravity of drumstick 1 that is located nearer to handle end 7 is specified and inputted to computer system 4 through user interface 21.

Figure 4:
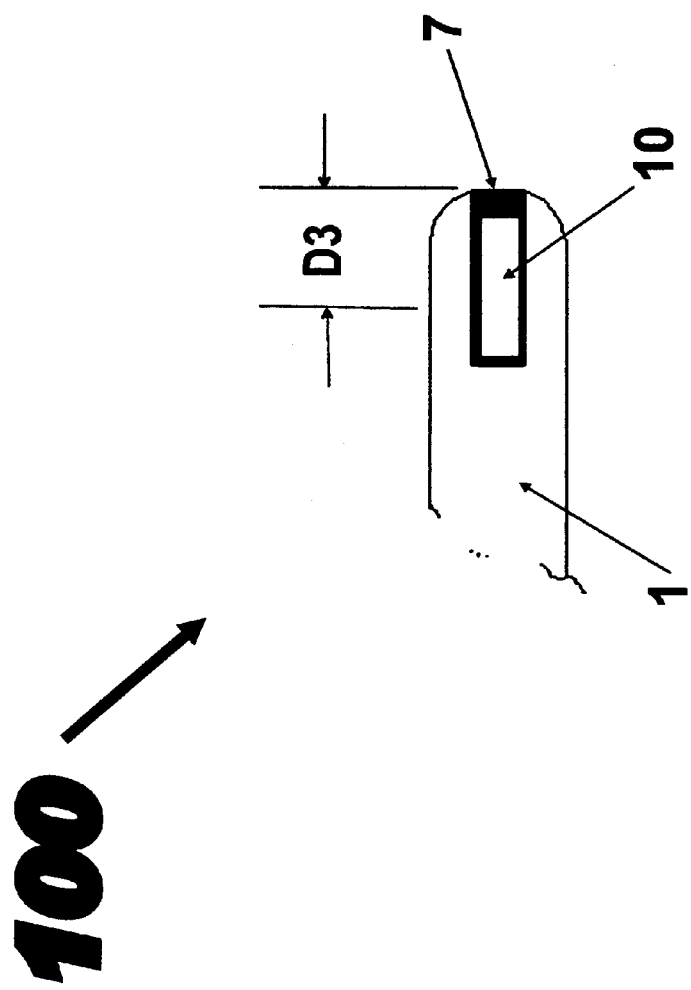
FIG. 4 depicts a cross-sectional view of a portion of a system embodying the principles of the present invention.

As illustrated in FIG. 4, weight element 10 comprises a weight that, when affixed to the handle end 7 of drumstick 1, permanently repositions the longitudinal center of gravity of drumstick 1 from the original calculated location to the desired new location inputted to computer system 4. Weight element 10 comprises a weight configured of metal material that is uniform in cross-sectional area and uniform in density. The uniform cross-sectional area and uniform density of the material for weight element 10 are inputted to computer system 4 through user interface 21. A center of gravity location for weight element 10 at a distance D3 from handle end 7 of drumstick 1 is specified and inputted to computer system 4 through user interface 21. A weight allowance for method of fixation of weight element 10 to handle 7 and a location for the fixation method weight allowance are specified and inputted to computer 4 through user interface 21, wherein the location for the fixation method weight allowance is distance D3 from handle end 7.

In one embodiment of balanced drumstick system 100, the metal material from which weight element 10 is configured comprises lead. In other embodiments, the metal material may comprise another metal or a similar material that is substantially higher in density than wood.

Microprocessor 20 calculates the required weight of weight element 10 to reposition the longitudinal center of gravity of drumstick 1 from the calculated original location to the specified new desired location based upon user inputs. Microprocessor 20 calculates the required length of weight element 10 based upon the calculated required weight of weight element 10 and the inputted uniform cross-sectional area and uniform density of the metal material used to configure weight element 10. Microprocessor 20 generates output control signals based upon the calculated length of weight element 10 and configured to control actuator 5.

Actuator 5 is configured to receive control signals 26 generated by microprocessor 20 and operate cutting device 6 to cut weight element 10 based upon the control signals 26. Actuator 5 comprises a device configured to grip or hold metal material for weight element 10 and to move the metal material for weight element 10 into position for cutting to the required length calculated by microprocessor 20. After the metal material for weight element 10 is positioned, actuator 5 actuates cutting device 6 to cut the material to the required length to create weight element 10. Cutting device 6 comprises one of a knife, saw, scissors, grinder and torch configured to cut material for weight element 10 to the required length.

In an example embodiment of balanced drumstick system 100, actuator 5 comprises a movable clamping or holding structure controllably driven by a stepper motor.

Weight element 10 is affixed to handle end 7 of drumstick 1 by a method of permanent attachment, wherein weight element 10 moves in synchronization with movement of drumstick 1 and wherein there is no relative movement between weight element 10 and drumstick 1. The method of attachment of weight element 10 to drumstick 1 comprises one or more of an adhesive, a cap and a plug, wherein weight element 10 is encapsulated within the one or more of an adhesive, a cap and a plug such that there is no direct contact between the surfaces of weight element 10 and drumstick 1.

Drumstick 1 balanced to a new specified longitudinal center of gravity by the present invention has a repositioned longitudinal center of gravity within 0.25% of the length of drumstick 1 from the new specified longitudinal center of gravity.

In other embodiments of the invention, computer system 4, weight signal 23 from first scale 2, weight signal 24 from second scale 3 and control signals 26 may be omitted, wherein the weight-measurements of first scale 2 and second scale 3 are read visually, wherein the calculations to determine the length of weight element 10 are performed manually and wherein actuator 5 and cutter 6 are operated manually.

Drumstick balancing system 100 balances a plurality of wood drumsticks 1 comprising two or more wood drumsticks 1 to create sets of drumsticks with a common, repositioned longitudinal center of gravity. The drumsticks 1 of the plurality are substantially equal in length and shape, but have unequal weights and original longitudinal centers of gravity due to density variations inherent to wood material.

The method of balancing the plurality of wood drumsticks 1 to create a set of drumsticks comprises locating, for each one of the drumsticks 1, an original longitudinal center of gravity; selecting, from the plurality of drumsticks 1, the drumstick 1 with an original longitudinal center of gravity located nearest to the handle end 7 of the drumstick 1; specifying, for the selected drumstick 1, a new longitudinal center of gravity that is nearer to the handle end of the drumstick 1; specifying, for each one of the drumsticks 1, a new longitudinal center of gravity that is the same as the specified new longitudinal center of gravity of the selected drumstick 1, such that the plurality of drumsticks 1 has a common new specified longitudinal center of gravity; calculating, for each one of the drumsticks 1, a weight element 10 required to be affixed to the handle end 7 of the drumstick 1 to permanently reposition the longitudinal center of gravity of the drumstick 1 to the common new specified location; affixing, to the handle end 7 of each drumstick 1, the corresponding required weight element 10.

In the example embodiment illustrated, drumstick balancing system 100 facilitates repositioning a longitudinal center of gravity of each of the drumsticks 1 within 0.25% of the length of the drumstick 1 from the common new specified longitudinal center of gravity for the plurality. Balanced drumstick system 100 automates the repositioning of the longitudinal center of gravity of wood drumsticks to increase accuracy and to decrease time to create sets of custom wood drumsticks.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method of balancing a plurality of wood drumsticks of substantially equal length and shape, each drumstick including a handle end and a striking end, comprising:
    locating, for each one of the drumsticks, an original longitudinal center of gravity using a computer system;
    receiving, for each one of the drumsticks, a common longitudinal center of gravity that is nearer to the handle end of the drumstick than the original longitudinal center of gravity of the drumstick, such that each one of the plurality of drumsticks has a common target longitudinal center of gravity;
    receiving, for each one of the drumsticks, a common longitudinal distance from the handle end of the drumstick that defines a center of gravity for a weight element to be affixed within an aperture formed in the handle end of the drumstick; and
    calculating, for each one of the drumsticks, a weight of the weight element that, when the weight element is affixed within the aperture with its center of gravity at the common longitudinal distance, will permanently reposition the longitudinal center of gravity of the drumstick to the common target longitudinal center of gravity.

2. The method of claim 1, wherein, for each one of the drumsticks, a repositioned longitudinal center of gravity is within 0.25% of the length of the drumstick from the common target longitudinal center of gravity.

3. The method of claim 2, wherein locating an original longitudinal center of gravity of a drumstick comprises:
    placing the drumstick to bear weight simultaneously on first and second weight-measurement scales such that the striking end of the drumstick is nearest to the first weight-measurement scale and contacts a distance locator at a fixed distance from a location on the drumstick that bears on the first scale;
    measuring a first weight of the drumstick bearing on the first scale;
    measuring a second weight of the drumstick bearing on the second scale; and
    calculating, with the first weight, the second weight, the length of the drumstick, the fixed distance and a distance between the location on the drumstick that bears on the first scale and a location on the drumstick that bears on the second scale, the original longitudinal center of gravity of the drumstick.

4. The method of claim 3, further comprising:
    receiving, for each one of the drumsticks, the length of the drumstick;
    receiving the common longitudinal distance once for the plurality of wood drumsticks; and
    receiving the distance between the location on the drumstick that bears on the first scale and the location on the drumstick that bears on the second scale once for the plurality of wood drumsticks.

5. The method of claim 3, wherein calculating a weight of the weight element comprises:
    calculating, with the computer system, for each one of the drumsticks, the weight based upon the common target longitudinal center of gravity, the common longitudinal distance from the handle end of the drumstick, characteristics of a material forming the weight element and the original longitudinal center of gravity of the drumstick.

6. The method of claim 5, further comprising:
    receiving, at the computer system, a density and a cross-sectional area of a metal material, the density and the cross-sectional area being uniform along a length of the metal material; and
    calculating, with the computer system, a length of the metal material required to produce the weight element having the calculated weight.

7. The method of claim 6, wherein the metal material is lead and the weight element comprises the lead encapsulated within one or more of an adhesive, a cap or a plug within the aperture.

8. The method of claim 6, further comprising:
    generating, with the computer system, an output control signal representing the length of the metal material required to produce the calculated weight;
    operating an actuator in response to the control signal to position the metal material for cutting to the required length; and
    cutting the metal material.

9. A plurality of wood drumsticks of substantially equal length and shape, each drumstick including a handle end with a weight element affixed thereto, a striking end, and an original longitudinal center of gravity in an absence of the weight element;
    wherein, for each one of the drumsticks, a longitudinal center of gravity including the weight element is located nearer to the handle end than the original longitudinal center of gravity;
    wherein, for each one of the drumsticks, the weight element has a weight selected to reposition the original longitudinal center of gravity of the drumstick toward the handle end to a common target longitudinal center of gravity;
    wherein, for each one of the drumsticks, the weight element comprises a material encapsulated within an aperture formed in the handle end such that there is no direct contact between surfaces of the material and the drumstick; and
    wherein, for each one of the drumsticks, the weight element has a length determined based on the selected weight and is centered at a longitudinal distance from the handle end, the longitudinal distance being common to each one of the drumsticks.

10. The plurality of drumsticks of claim 9, wherein, for each one of the drumsticks, the longitudinal center of gravity including the weight element is no more than 0.25 % of the length of the drumstick from the common target longitudinal center of gravity.

11. The plurality of drumsticks of claim 10, wherein the material is a metal material of a uniform density and a uniform cross-sectional area.

12. The plurality of drumsticks of claim 11, wherein the metal material is lead and the lead is encapsulated with one or more of an adhesive, a cap or a plug.

13. An apparatus comprising:
    only two weight-measurement scales, the only two weight-measurement scales including a first weight-measurement scale and a second weight-measurement scale configured to measure the weight of a drumstick, the drumstick including a handle end and a striking end, at a first location and a second location along a length of the drumstick, respectively;
    a cutting device configured to cut material to form a weight element for securement to the drumstick
    an actuator configured to move the cutting device;
    a surface extending in a vertical direction relative to a horizontal spacing between the only two weight-measurement scales, the surface located at a first distance from the first weight- measurement scale and a second distance from the second weight-measurement scale that is equal to the first distance plus the horizontal spacing between the only two weight-measurement scales and the surface extending in the vertical direction to a height sufficient such that, when the drumstick is supported by the only two weight measurement scales, the drumstick contacts the surface at a position along the vertical direction; and
    a computer system including a microprocessor and a user interface, the microprocessor configured to generate control signals based upon user input through the user interface and input from the first and second weight-measurement scales, where the actuator is configured to operate the cutting device to cut the material to form the weight element based upon the control signals.

14. The apparatus of claim 13,
    wherein the microprocessor is configured to generate the control signals by:
    calculating a weight for the weight element using the length of the drumstick, the first distance, the horizontal spacing, the material to form the weight element, an original longitudinal center of gravity of the drumstick in the absence of the weight element, a target longitudinal center of gravity of the drumstick when the weight element is secured to the handle end of the drumstick and a target center of gravity of the weight element along the length of the drumstick; and using the weight and characteristics of the material to generate the control signals.

15. The apparatus of claim 14 wherein the characteristics include a density and a cross-section of the material, the density and the cross-section being uniform along a length of the material.

16. The apparatus of claim 13, wherein the user input through the user interface includes the length of the drumstick, a target position along the length of the drumstick for a center of gravity of the weight element and a target location along the length of the drumstick to which the longitudinal center of gravity of the drumstick will be repositioned when the weight element is secured to the handle end of the drumstick.

17. The apparatus of claim 16, wherein the repositioned longitudinal center of gravity of the drumstick achieved by securement of the weight element to the handle end of the drumstick is no more than 0.25% of the length of the drumstick from the target location.

18. The apparatus of claim 16, wherein the microprocessor is configured to generate the control signals based upon the first distance, the horizontal spacing, the length of the drumstick, the target position, the target location and characteristics of the material that forms the weight.

19. The method of claim 1, further comprising:

affixing, to the handle end of each drumstick, the coeesponding weight element such that the weight element comprises a metal material encapsulated within the handle end of the drumstick.

* * * * *